US010833922B2

(12) United States Patent
Pham

(10) Patent No.: US 10,833,922 B2
(45) Date of Patent: Nov. 10, 2020

(54) METHODS, SYSTEMS, AND MEDIA FOR ADDING IP ADDRESSES TO FIREWALLS

(71) Applicants: Synergex Group, Greenwich, CT (US); Wayne Taylor, Chandler, AZ (US); Pham Holdings, Inc., Lacey, WA (US)

(72) Inventor: Thien Van Pham, Lacey, WA (US)

(73) Assignees: Synergex Group, Greenwich, CT (US); Pham Holdings, Inc., Lacey, WA (US); Wayne Taylor, Chandler, AZ (US)

( * ) Notice: Subject to any disclaimer, the term of this patent is extended or adjusted under 35 U.S.C. 154(b) by 84 days.

(21) Appl. No.: 15/702,338

(22) Filed: Sep. 12, 2017

(65) Prior Publication Data
US 2019/0081854 A1    Mar. 14, 2019

(51) Int. Cl.
| G06F 9/00 | (2006.01) |
| G06F 15/16 | (2006.01) |
| G06F 17/00 | (2019.01) |
| H04L 12/24 | (2006.01) |
| H04L 29/06 | (2006.01) |
| H04L 29/12 | (2006.01) |

(52) U.S. Cl.
CPC .......... *H04L 41/0803* (2013.01); *H04L 41/22* (2013.01); *H04L 61/255* (2013.01); *H04L 63/029* (2013.01); *H04L 63/0236* (2013.01); *H04L 63/101* (2013.01); *H04L 61/2514* (2013.01); *H04L 61/609* (2013.01)

(58) Field of Classification Search
USPC .......................................................... 726/11
See application file for complete search history.

(56) References Cited

U.S. PATENT DOCUMENTS

| 2012/0284770 A1* | 11/2012 | Bartholomy | ............ H04L 12/66 726/1 |
| 2013/0311649 A1* | 11/2013 | DeFrancesco | .......... H04L 43/04 709/224 |
| 2015/0358358 A1 | 12/2015 | Karhade | |

(Continued)

OTHER PUBLICATIONS

International Search Report and Written Opinon dated Nov. 26, 2018 in International Patent Application No. PCT/US2018/050450.

(Continued)

*Primary Examiner* — Wasika Nipa
*Assistant Examiner* — Samuel Ambaye
(74) *Attorney, Agent, or Firm* — Byrne Poh LLP

(57) ABSTRACT

Methods, systems, and media for adding IP addresses to firewalls are provided. In some embodiments, the method comprises: receiving a network packet that includes an external IP address associated with an external device, wherein the external device is a device not protected by a firewall; determining whether the external IP address is included in a group of IP addresses maintained by the firewall; determining whether to add the external IP address to the group of IP addresses; identifying an Internet Service Provider (ISP) associated with the external IP address; determining whether the ISP is included in a group of ISPs maintained by the firewall; and in response to determining that the ISP is not included in the group of ISPs maintained by the firewall, adding the external IP address to the group of IP addresses and adding the ISP to the group of ISPs.

15 Claims, 5 Drawing Sheets

(56) References Cited

U.S. PATENT DOCUMENTS

2017/0005979 A1\* 1/2017 Tagore .................... H04L 45/38
2017/0005986 A1   1/2017 Bansal et al.
2017/0126740 A1\* 5/2017 Bejarano Ardila ..... H04L 63/20

OTHER PUBLICATIONS

Jones, G., "Operational Security Requirements for Large Internet Service Provider (ISP) IP Network Infrastructure.", in RCF-Editor, Sep. 2004, available at: https://www.rfc-editor.org/rfc/pdfrfc/rfc3871.txt.pdg.

\* cited by examiner

| TIME | SOURCE | DESTINATION | LOCATION | ISP | DOMAIN | # BLOCKED |
|---|---|---|---|---|---|---|
| 1:04 PM | 172.31.98.111:5153 | 8.8.8.8:53 | Chicago, US | ISP NAME A | domainA.com | 1 |
| 1:05 PM | 172.31.98.111:1252 | 8.8.4.4:80 | Chicago, US | ISP NAME A | domainA.com | 10 |
| 1:06 PM | 172.31.98.111:5288 | 23.40.17.2:443 | Paris, France | ISP NAME B | domainB.com | 0 |
| 1:07 PM | 172.31.98.111:1277 | 172.45.3.194:80 | Arlington, US | ISP NAME C | domainC.com | 2 |
| 1:08 PM | 172.31.98.111:1251 | 13.215.3.4:1900 | San Jose, US | ISP NAME D | domainD.com | 4 |

FIG. 5

METHODS, SYSTEMS, AND MEDIA FOR ADDING IP ADDRESSES TO FIREWALLS

TECHNICAL FIELD

The disclosed subject matter relates to methods, systems, and media for adding IP addresses to firewalls.

BACKGROUND

Devices, such as servers, frequently use firewalls to protect the devices from malicious users, such as hackers, and viruses. To protect a device, a firewall can identify Internet Protocol (IP) addresses of devices that are not allowed access to the device and blocks incoming and/or outgoing data from being received from and/or transmitted to devices associated with blocked IP addresses. However, it can be difficult to determine whether an IP address should be blocked by a firewall.

Accordingly, it is desirable to provide new methods, systems, and media for adding IP addresses to firewalls.

SUMMARY

Methods, systems, and media for adding IP addresses to firewalls are provided. In accordance with some embodiments of the disclosed subject matter, a method for adding IP addresses to firewalls is provided, the method comprising: receiving a network packet that includes an external IP address associated with an external device, wherein the external device is a device not protected by a firewall; determining whether the external IP address is included in a group of IP addresses maintained by the firewall that are either blocked from receiving data from an internal device protected by the firewall or allowed to receive data from an internal device protected by the firewall; in response to determining that the external IP address is not included in the group of IP addresses, determining whether to add the external IP address to the group of IP addresses; in response to determining that the external IP address is to be added to the group of IP addresses, identifying an Internet Service Provider (ISP) associated with the external IP address; determining whether the ISP is included in a group of ISPs maintained by the firewall; and in response to determining that the ISP is not included in the group of ISPs maintained by the firewall, adding the external IP address to the group of IP addresses and adding the ISP to the group of ISPs.

In accordance with some embodiments of the disclosed subject matter, a system for adding IP addresses to firewalls are provided, the system comprising: a hardware processor that is programmed to: receive a network packet that includes an external IP address associated with an external device, wherein the external device is a device not protected by a firewall; determine whether the external IP address is included in a group of IP addresses maintained by the firewall that are either blocked from receiving data from an internal device protected by the firewall or allowed to receive data from an internal device protected by the firewall; in response to determining that the external IP address is not included in the group of IP addresses, determine whether to add the external IP address to the group of IP addresses; in response to determining that the external IP address is to be added to the group of IP addresses, identify an Internet Service Provider (ISP) associated with the external IP address; determine whether the ISP is included in a group of ISPs maintained by the firewall; and in response to determining that the ISP is not included in the group of ISPs maintained by the firewall, add the external IP address to the group of IP addresses and adding the ISP to the group of ISPs.

In accordance with some embodiments of the disclosed subject matter, a non-transitory computer-readable medium containing computer executable instructions that, when executed by a processor, cause the processor to perform a method for adding IP addresses to firewalls is provided. The method comprises: receiving a network packet that includes an external IP address associated with an external device, wherein the external device is a device not protected by a firewall; determining whether the external IP address is included in a group of IP addresses maintained by the firewall that are either blocked from receiving data from an internal device protected by the firewall or allowed to receive data from an internal device protected by the firewall; in response to determining that the external IP address is not included in the group of IP addresses, determining whether to add the external IP address to the group of IP addresses; in response to determining that the external IP address is to be added to the group of IP addresses, identifying an Internet Service Provider (ISP) associated with the external IP address; determining whether the ISP is included in a group of ISPs maintained by the firewall; and in response to determining that the ISP is not included in the group of ISPs maintained by the firewall, adding the external IP address to the group of IP addresses and adding the ISP to the group of ISPs.

In accordance with some embodiments of the disclosed subject matter, a system for adding IP addresses to firewalls is provided, the system comprising: means for receiving a network packet that includes an external IP address associated with an external device, wherein the external device is a device not protected by a firewall; means for determining whether the external IP address is included in a group of IP addresses maintained by the firewall that are either blocked from receiving data from an internal device protected by the firewall or allowed to receive data from an internal device protected by the firewall; in response to determining that the external IP address is not included in the group of IP addresses, means for determining whether to add the external IP address to the group of IP addresses; in response to determining that the external IP address is to be added to the group of IP addresses, means for identifying an Internet Service Provider (ISP) associated with the external IP address; means for determining whether the ISP is included in a group of ISPs maintained by the firewall; and in response to determining that the ISP is not included in the group of ISPs maintained by the firewall, means for adding the external IP address to the group of IP addresses and adding the ISP to the group of ISPs.

In some embodiments, determining whether to add the external IP address to the group of IP addresses is based on input received via a user interface.

In some embodiments, the system further comprises means for causing the user interface to be presented, wherein the user interface indicates the external IP address and the ISP associated with the external IP address.

In some embodiments, the system further comprises means for identifying geographic information associated with the external IP address, wherein determining whether to add the external IP address to the group of IP addresses is based on the geographic information associated with the external IP address.

In some embodiments, the system further comprises means for causing a user interface to be presented that indicates a number of network packets that have been blocked that are associated with the external IP address.

In some embodiments, the system further comprises means for adding the external IP address to a group of IP addresses associated with the firewall that are blocked from transmitting data to the internal device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 5 shows an example of a user interface for presenting aggregated information relating to received network packets in accordance with some embodiments of the disclosed subject matter.

DETAILED DESCRIPTION

In accordance with various embodiments, mechanisms (which can include methods, systems, and media) for adding IP addresses to firewalls are provided.

In some embodiments, the mechanisms described herein can receive a network packet from a device and can determine whether an Internet Protocol (IP) address associated with the received network packet is to be blocked by a firewall. For example, in some embodiments, the mechanisms can determine whether an IP address is included in a list of IP addresses that are to be blocked by a firewall. Additionally, in some embodiments, the mechanisms can add an IP address or an Internet Service Provider (ISP) associated with an IP address to a list of IP addresses or ISPs blocked by a firewall. In some such embodiments, the mechanisms can determine information associated with an IP address based on a network packet. For example, the mechanisms can determine an ISP associated with an IP address and/or can determine geographic information associated with the IP address, and can add the IP address and/or the ISP to one or more lists of IP addresses and/or ISPs that are to be blocked by the firewall.

In some embodiments, the mechanisms can determine whether to block a particular IP address or an ISP associated with the particular IP address based on any suitable information. For example, in some embodiments, the mechanisms can determine that a particular IP address or an ISP associated with the particular IP address is to be added to a list of blocked IP addresses or blocked ISPs based on an explicit indication from a user (e.g., a user associated with administration of the firewall or of a device protected by the firewall), such as via a user interface, as shown in and described below in connection with FIG. 4A. Additionally, in some embodiments, the mechanisms can allow a user to unblock a blocked IP address and/or a blocked ISP, for example, via a user interface, as shown in and described below in connection with FIG. 4B.

In some embodiments, the mechanisms can present aggregated information relating to received network packets. For example, in some embodiments, the mechanisms can cause a user interface that includes a listing of received network packets to be presented. In some such embodiments, each entry in a list of received network packets can indicate an external IP address associated with a network packet (e.g., an IP address associated with a device not protected by the firewall that is attempting to connect to a device protected by the firewall, and/or any other suitable device), an internal IP address associated with the network packet (e.g., an IP address of a device protected by the firewall, and/or any other suitable device), an ISP corresponding to the external IP address associated with the network packet, and/or any other suitable information.

Figure 1:
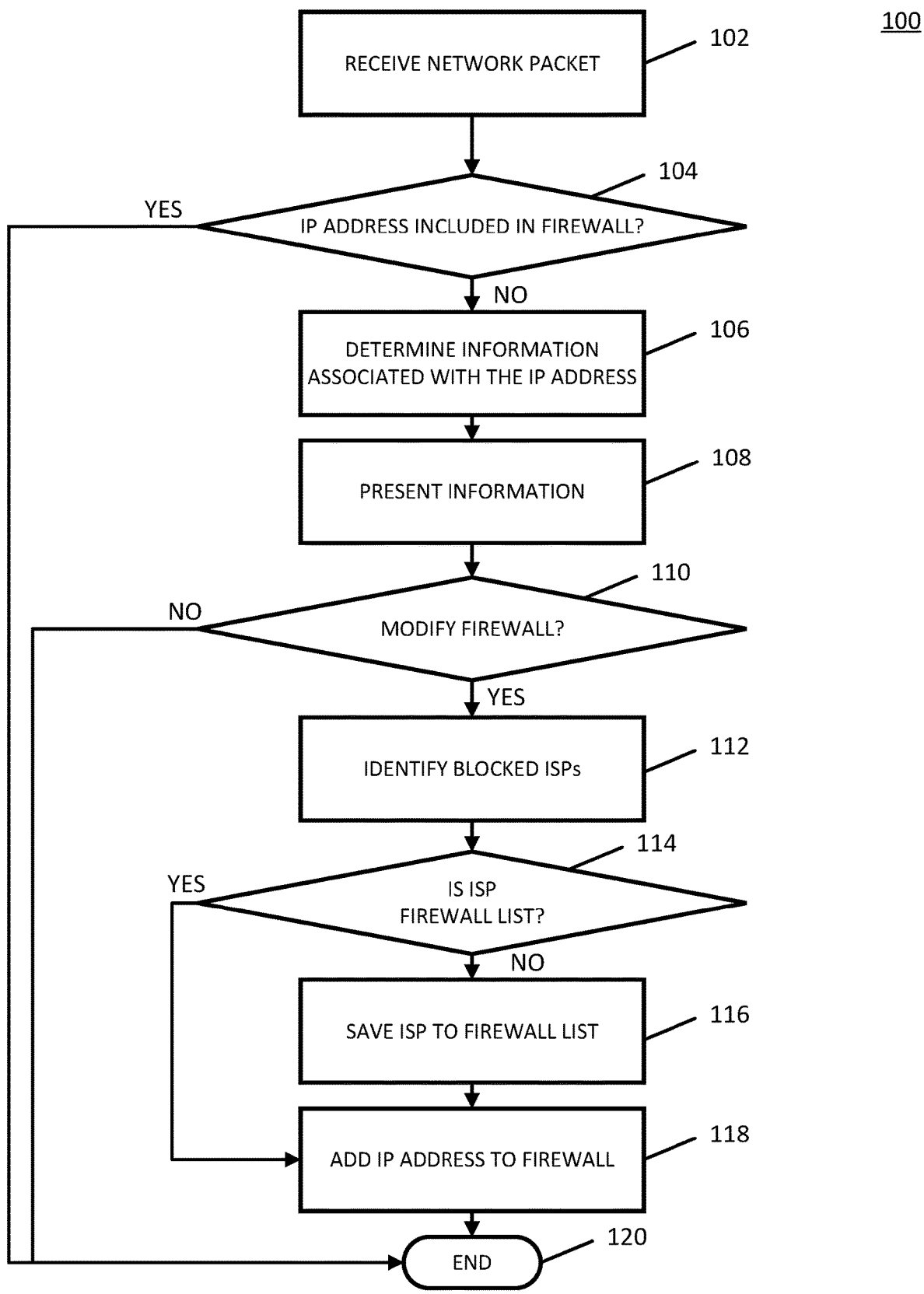
FIG. 1 shows an example of a process for adding an IP address to a firewall in accordance with some embodiments of the disclosed subject matter.

Turning to FIG. 1, an example 100 of a process for adding IP addresses to a firewall in accordance with some embodiments of the disclosed subject matter is shown. In some embodiments, blocks of process 100 can be executed on any suitable device, such as a firewall 212 as shown in and described below in connection with FIG. 2.

Process 100 can begin by receiving a network packet at 102. In some embodiments, the network packet can be received from any suitable device and can include any suitable information. For example, in some embodiments, the network packet can indicate a date and time the network packet was received, an internal IP address and port, an external IP address and port, a size of the network packet, and/or any other suitable information.

At 104, process 100 can determine whether an IP address included in the network packet received at 102 is included in a list or a group of IP addresses maintained by a firewall. Note that, in some embodiments, such a list or a group of IP addresses can be maintained by a firewall in any suitable manner. For example, in some embodiments, a list or a group of IP addresses can include inbound rules and/or outbound rules that indicate whitelisted IP addresses of external devices. As a more particular example, in some embodiments, an inbound rule can indicate IP addresses of external devices that are allowed to connect to devices protected by the firewall and an outbound rule can indicate IP addresses of external devices allowed to be connected to by devices protected by the firewall, and/or any other suitable information. As another example, in some embodiments, a list or a group of IP addresses can include inbound rules and/or outbound rules that indicate blacklisted IP addresses of external devices. As a more particular example, in some embodiments, an inbound rule can indicate IP addresses of external devices that are blocked from connected to devices protected by the firewall and an outbound rule can indicate IP addresses of external devices blocked from being connected to by devices protected by the firewall, and/or any other suitable information. Note that, in some embodiments, an inbound rule and/or an outbound rule can additionally or alternatively include internal IP addresses (e.g., IP addresses corresponding to devices protected by the firewall) that are allowed to communicate with external devices and/or blocked from communicating with external devices. In some embodiments, a rule can act as both an inbound rule and an outbound rule—i.e., by blocking both inbound and outbound traffic. In some embodiments, a rule can be both a whitelisting rule and a blacklisting rule—e.g., by allowing certain external IP addresses while blocking other external IP addresses.

Note that, in some embodiments, an inbound rule and/or an outbound rule can specify one or more ports or programs that are allowed to connect with devices protected by the firewall or that are blocked from connecting with devices protected by the firewall. Additionally or alternatively, in some embodiments, an inbound rule and/or an outbound rule can include a scope that indicates a particular IP address or a range of IP addresses that are allowed access to devices protected by the firewall or that are blocked from accessing devices protected by the firewall.

In some embodiments, process 100 can determine whether an IP address associated with a received network packet is included in a list of IP addresses (e.g., a list associated with an inbound rule, a list associated with an outbound rule, and/or any other suitable list or group) in any suitable manner. For example, in some embodiments, process 100 can determine whether an external IP address associated with a received network packet is included in an inbound rule that indicates blocked IP addresses, an inbound rule that indicates allowed IP addresses, an outbound rule that indicates blocked IP addresses, an outbound rule that indicates allowed IP addresses, and/or included in any other suitable group.

If, at 104, process 100 determines that an IP address is included in one or more lists maintained by the firewall ("yes" at 104), process 100 can end at 120.

If, at 104, process 100 determines that the IP address is not included in one or more lists maintained by the firewall ("no" at 104), process 100 can determine information associated with the IP address at 106. In some embodiments, process 100 can determine any suitable information. For example, in some embodiments, process 100 can determine an Internet Service Provider (ISP) associated with an external IP address corresponding to a network packet, a geographic location associated with the external IP address (e.g., a latitude and/or a longitude, and/or any other suitable geographic information), a domain associated with the external IP address, and/or any other suitable information. In some embodiments, process 100 can determine the information associated with the IP address using any suitable technique or combination of techniques. For example, in some embodiments, process 100 can query a database, such as a database stored in a memory of the firewall and/or of a device protected by the firewall (e.g., memory 304 of firewall 212 and/or memory 304 of server(s) 202 as described below in connection with FIGS. 2 and 3, and/or any other suitable memory). As another example, in some embodiments, process 100 can connect to an online IP address translator. As a more particular example, in some embodiments, process 100 can transmit the IP address to an online IP address translator and can receive information associated with the IP address in response to the transmitted query.

Figures 4A, 4B:
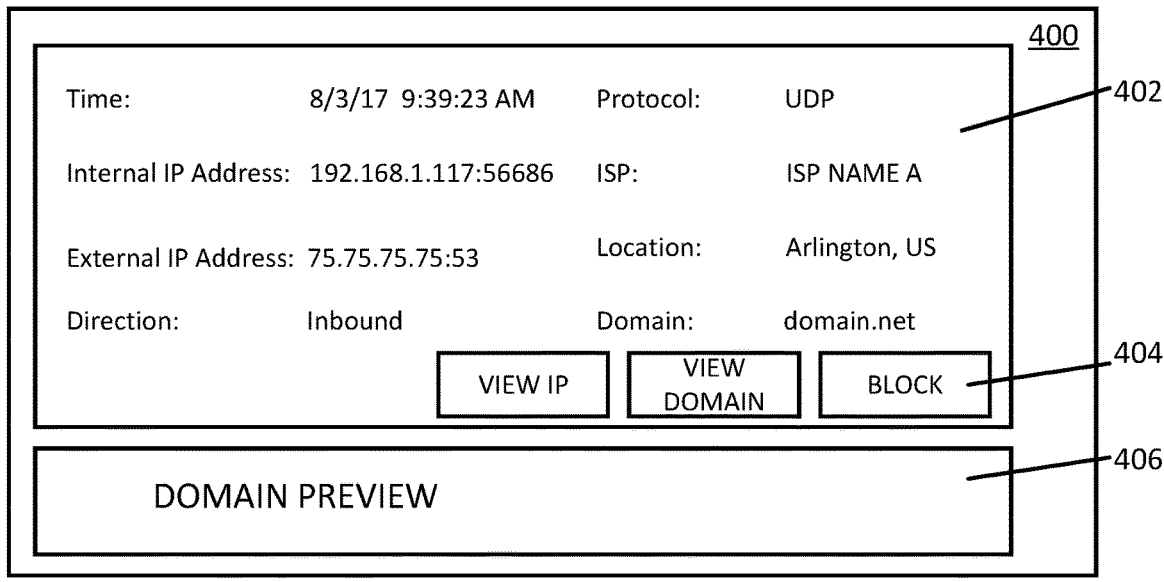
FIG. 4A shows an example of a user interface for blocking an IP address in accordance with some embodiments of the disclosed subject matter.
FIG. 4B shows an example of a user interface for presenting aggregated information relating to blocked IP addresses in accordance with some embodiments of the disclosed subject matter.

At 108, process 100 can present information to a user, such as, for example, a user associated with administration of the firewall. FIG. 4A shows an example 400 of a user interface for presenting information associated with a received network packet. As illustrated, in some embodiments, user interface 400 can include information 402, which can include, for example, a date or a time the network packet was received, an external IP address and port, an internal IP address and port, a communication protocol, an ISP name associated with the external IP address, geographic information associated with the external IP address, a directionality of the network packet (e.g., whether the destination of the network packet is a device protected by the firewall or a device not protected by the firewall), and/or a domain name associated with the external IP address. In some embodiments, user interface 400 can include a selectable input 404 to block the external IP address associated with the network packet. In some such embodiments, selection of input 404 can cause the external IP address to be added to firewall rules that indicate IP addresses not allowed to communicate with devices protected by the firewall (e.g., server(s) 202 as shown in and described below in connection with FIG. 2). Additionally, in some embodiments, user interface 400 can include selectable inputs to view a page corresponding to the external IP address, view a page corresponding to the domain associated with the external IP address, and/or view a page corresponding to the ISP associated with the external IP address. In some embodiments, user interface 400 can include a domain preview 406 that shows a web page corresponding to the domain. For example, in instances where the domain is "www.domainA.com," domain preview 406 can show the web page that corresponds to "www.domainA.com."

Note that, in some embodiments, process 100 can additionally present aggregated information that indicates IP addresses and/or ISPs that have been blocked by the firewall. Turning to FIG. 4B, an example 450 of a user interface for showing aggregated information in accordance with some embodiments of the disclosed subject matter is shown. As illustrated, in some embodiments, user interface 450 can include information about IP addresses and/or ISPs that have been blocked by the firewall, for example, in response to a user of user interface 400 indicating that a particular IP address or ISP is to be blocked. In some embodiments, user interface 450 can include a list of blocked IP addresses, and each entry, such as entry 452, can indicate a name of an ISP associated with a blocked IP address, a geographic location associated with the blocked IP address, and/or a domain name associated with the blocked IP address. In some embodiments, selection of entry 452 can allow a user of user interface 450 to change a status of entry 452, for example, by unblocking a blocked IP address or ISP.

Returning to FIG. 1, at 110, process 100 can determine whether the firewall is to be modified. In some embodiments, process 100 can determine whether the firewall is to be modified based on any suitable information. For example, in some embodiments, process 100 can determine whether the firewall is to be modified based on whether a user of user interface 400 has indicated that an IP address associated with the received network packet or an ISP associated with the IP address is to be blocked. As a more particular example, in some embodiments, a user of user interface 400 can indicate that an external IP address associated with the received network packet is to be blocked and/or that an ISP associated with the external IP address is to be blocked. As another more particular example, in some embodiments, a user of user interface 400 can indicate that an external IP address associated with the received network packet is to be allowed and/or that an ISP associated with the external IP address is to be allowed. As yet another more particular example, in some embodiments, a user of user interface 400 can indicate that an internal IP address associated with the received network packet is to be blocked in any suitable manner (e.g., blocked from communicating with all external devices not protected by the firewall, blocked from communicating with an external device associated with the external IP address, blocked from communicating with external devices associated with the external ISP, and/or blocked in any other suitable manner).

As another example, in some embodiments, process 100 can determine that an IP address is to be blocked based on the port number associated with the IP address. As a more particular example, in some embodiments, process 100 can determine that an IP address is to be blocked based on the port number of the network packet corresponding to a particular activity, such as file transfer, web browsing, remote printing, and/or any other suitable activity. As yet another example, in some embodiments, process 100 can determine that an IP address is to be blocked based on a type of protocol associated with the network packet (e.g., Transmission Control Protocol, User Datagram Protocol, and/or any other suitable protocol). As still another example, in some embodiments, process 100 can determine that an IP address is to be blocked based on any other suitable information, such as a domain associated with an external IP address, a geographic location associated with the external IP address, and/or any other suitable information.

At 112, process 100 can identify one or more ISPs that are blocked by the firewall. For example, in some embodiments, the blocked ISPs can include ISPs associated with previously blocked external IP addresses. In some embodiments, process 100 can identify the one or more blocked ISPs using any suitable information and using any suitable technique(s). For example, in some embodiments, process 100 can retrieve a list of blocked ISPs stored in memory of the firewall and/or of a device protected by the firewall (e.g., memory 304 of firewall 212 and/or memory 304 of server(s) 202, as described below in connection with FIGS. 2 and 3). In some embodiments, the blocked ISPs can include ISPs blocked by inbound rules and/or outbound rules, as described above.

At 114, process 100 can determine whether the ISP associated with the external IP address is included in a list of allowed or blocked ISPs.

If, at 114, process 100 determines that the ISP is not included in a list of ISPs ("no" at 114), at 116, process 100 can add the ISP associated with the external IP address to a list stored in memory (e.g., memory 304 of firewall 212, memory 304 of server(s) 202, and/or any other suitable location), such as the list of blocked ISPs described above in connection with block 112.

If, at 114, process 100 determines that the ISP is included in the list of ISPs ("yes" at 114), process 100 can proceed to 118.

At 118, process 100 can add the IP address to any suitable lists associated with and/or maintained by the firewall. For example, in some embodiments, process 100 can add an external IP address to an inbound rules list that indicates IP addresses blocked from connecting to devices protected by the firewall. As another example, in some embodiments, process 100 can add an IP address to an outbound rules list that indicates IP addresses blocked from being connected to by devices protected by the firewall. As yet another example, in some embodiments, process 100 can add an external IP address to an inbound rules list that indicates IP addresses allowed to connect to devices protected by the firewall. As still another example, in some embodiments, process 100 can add an external IP address to an outbound rules list that indicates IP addresses allowed to be connected to by devices protected by the firewall. Note that, in some embodiments, process 100 can add an internal IP address associated with a received network packet to any suitable lists associated with and/or maintained by the firewall, such as inbound rules that indicate blocked IP addresses, outbound rules that indicate blocked IP addresses, inbound rules that indicate allowed IP addresses, outbound rules that indicate allowed IP addresses, and/or any other suitable lists or rules.

Note that, in some embodiments, process 100 can cause any suitable information to be presented to a user, such as a user associated with administration of the firewall. For example, as shown in user interface 500 of FIG. 5, process 100 can present information corresponding to an aggregation of network packets that have been received. As illustrated, in some embodiments, user interface 500 can include a listing of network packets that have been received, and can include individual entries, such as entry 502. As shown, entry 502 can include any suitable information, such as a date and a time that a network packet was received, an external IP address associated with the network packet, an internal IP address associated with the network packet, a geographic location associated with the network packet, an ISP name corresponding to the external IP address associated with the network packet, a domain name associated with the external IP address of the network packet, and/or any other suitable information. Additionally, as shown in user interface 500, entry 502 can indicate a number of network packets received corresponding to a blocked IP address that have been blocked by the firewall previously over any suitable time frame (e.g., total packets in the past week, total packets in the past month, and/or a number of packets blocked over any other suitable time frame).

Process 100 can end at 120.

Figure 2:
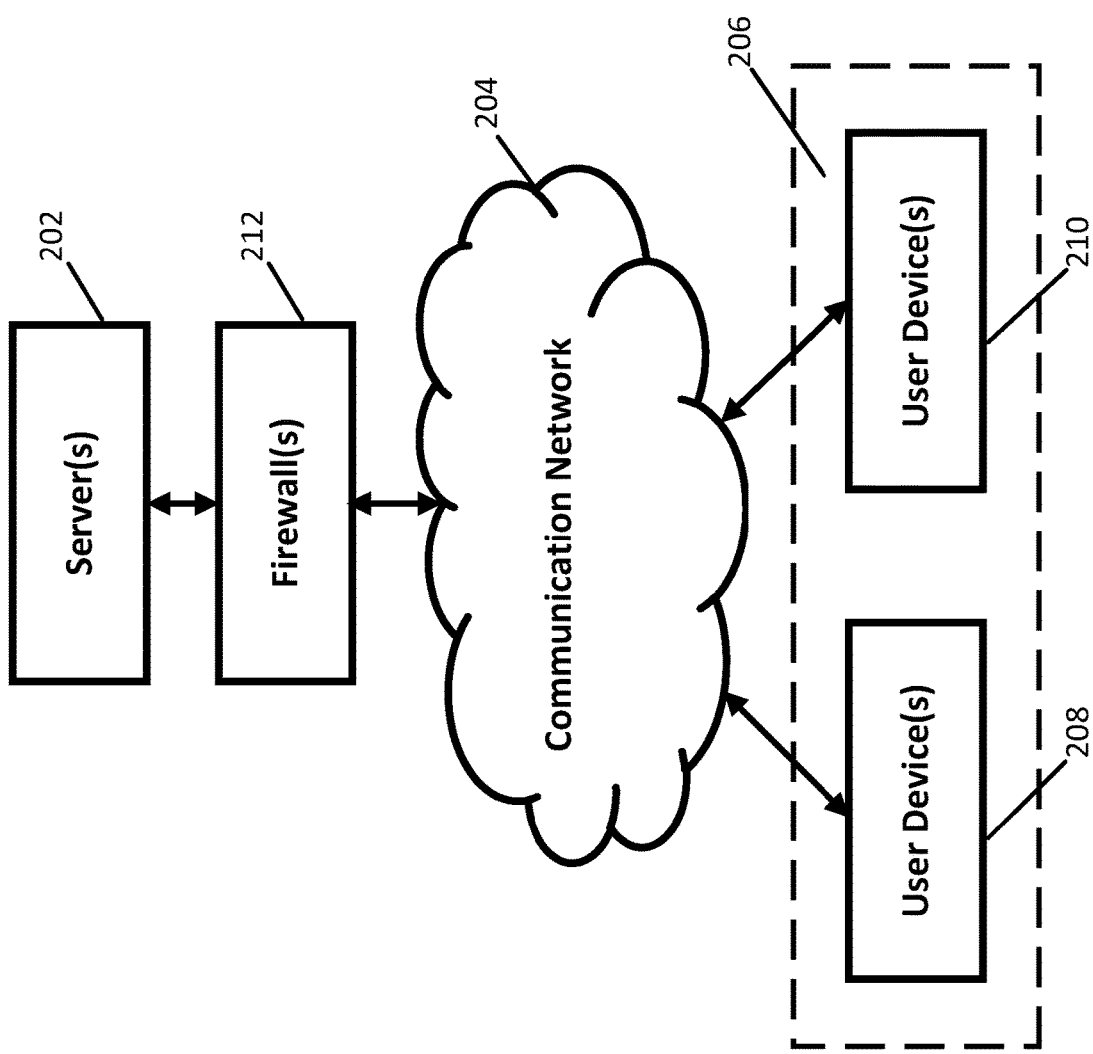
FIG. 2 shows a schematic diagram of an illustrative system suitable for adding IP addresses to a firewall in accordance with some embodiments of the disclosed subject matter.
Figure 3:
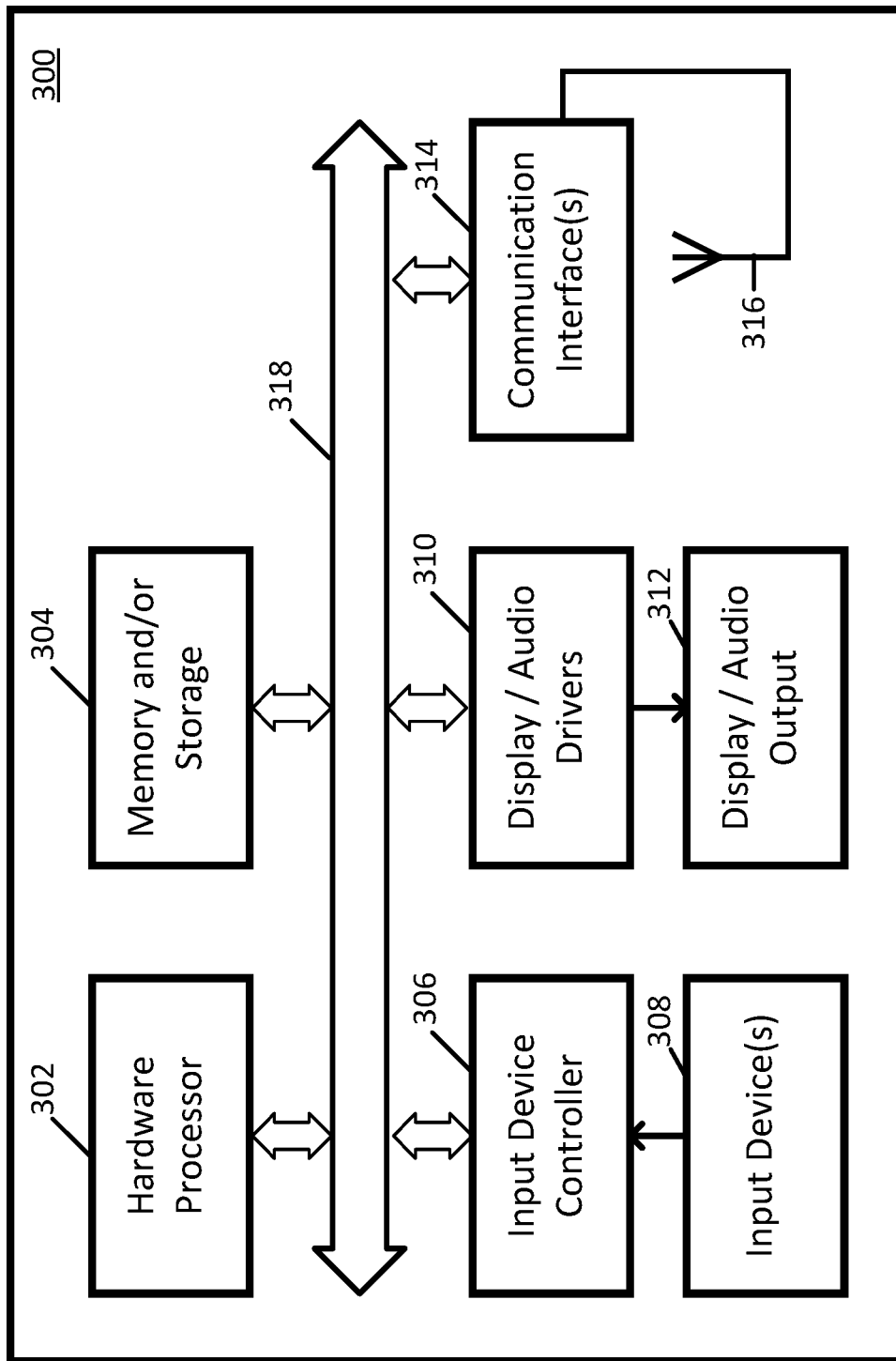
FIG. 3 shows a detailed example of hardware that can be used in a server and/or a user device of FIG. 2 in accordance with some embodiments of the disclosed subject matter.

Turning to FIG. 2, an example 200 of hardware for adding IP addresses to firewalls that can be used in accordance with some embodiments of the disclosed subject matter is shown. As illustrated, hardware 200 can include one or more servers 202, a communication network 204, one or more user devices 206, such as user devices 208 and 210, and/or a firewall 212.

Server(s) 202 can be any suitable server(s) for storing data or providing services to devices, such as user devices 206. For example, in some embodiments, server(s) 202 can store media content, such as videos, television programs, movies, live-streamed media content, audio content, and/or any other suitable media content. As another example, in some embodiments, server(s) 202 can be associated with a web site or service that provides any suitable service(s), such as an online database, an online retailer, and/or any other suitable type of service. In some embodiments, server(s) 202 can be protected by firewall 212, as described above in connection with FIG. 1.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links to communication network 204 that can be linked via one or more communications links to server(s) 202. The communications links can be any communications links suitable for communicating data among user devices 206 and server(s) 202 such as network links, dial-up links, wireless links, hard-wired links, any other suitable communications links, or any suitable combination of such links. In some embodiments, communication via communication network 204 can be through transmitted network packets corresponding to any suitable type of communication protocol, such as Transmission Control Protocol (TCP), User Datagram Protocol (UDP), and/or any other suitable protocol.

User devices 206 can include any one or more user devices suitable for communicating with server(s) 202. For example, in some embodiments, user devices 206 can include a mobile device, such as a mobile phone, a tablet computer, a wearable computer, a laptop computer, a vehicle (e.g., a car, a boat, an airplane, or any other suitable vehicle) information and/or entertainment system, and/or any other suitable mobile device. As another example, in some embodiments, user devices 206 can include a non-mobile device, such as a television, a projector device, a game console, desktop computer, and/or any other suitable non-mobile device.

Firewall 212 can be any suitable device for protecting server(s) 202. For example, in some embodiments, firewall 212 can be a device that stores and maintains lists of external IP addresses allowed to connect to and/or blocked from connecting to user devices 206. As another example, in some embodiments, firewall 212 can store and maintain lists of external IP addresses allowed to be connected to and/or blocked from being connected to by user devices 206. As yet another example, in some embodiments, firewall 212 can store and maintain lists of internal IP addresses that are to be blocked from communicating with external devices not protected by firewall 212 and/or lists of internal IP addresses that are allowed to communicate with external devices not protected by firewall 212. Note that, although firewall 212 is shown as a device separate from server(s) 202, in some embodiments, firewall 212 can be combined with any of server(s) 202.

Although server(s) 202 is illustrated as one device, the functions performed by server(s) 202 can be performed using any suitable number of devices in some embodiments. For example, in some embodiments, multiple devices can be used to implement the functions performed by server(s) 202.

Although two user devices 208 and 210 are shown in FIG. 2 to avoid over-complicating the figure, any suitable number of user devices, and/or any suitable types of user devices, can be used in some embodiments.

Server(s) 202 and user devices 206 can be implemented using any suitable hardware in some embodiments. For example, in some embodiments, devices 202 and 206 can be implemented using any suitable general purpose computer or special purpose computer. For example, a mobile phone may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a computer program stored in memory and/or storage 304 of a firewall device (e.g., such as firewall 212). For example, in some embodiments, the computer program can cause hardware processor 302 to identify information associated with an IP address and, based on the information, determine whether to add the IP address to a list of blocked IP addresses maintained by firewall 212.

Memory and/or storage 304 can be any suitable memory and/or storage for storing programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

In some embodiments, at least some of the above described blocks of the process of FIG. 1 can be executed or performed in any order or sequence not limited to the order and sequence shown in and described in connection with the figure. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/ or any suitable non-transitory tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for adding IP addresses to firewalls are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for adding Internet Protocol (IP) addresses to a firewall, comprising:
    receiving a network packet that includes an external IP address associated with an external device, wherein the external device is a device not protected by the firewall;
    determining whether the external IP address is included in a group of IP addresses maintained by the firewall that are either blocked from receiving data from an internal device protected by the firewall or allowed to receive data from an internal device protected by the firewall;
    in response to determining that the external IP address is not included in the group of IP addresses:
        identifying an Internet Service Provider (ISP) associated with the external IP address;
        causing a user interface to be presented to a user, wherein the user interface includes a preview that shows a web page of a domain associated with the external IP address;
        determining whether to add the external IP address to the group of IP addresses based at least in part on the ISP associated with the external IP address;
        in response to determining that the external IP address is to be added to the group of IP addresses:
            determining whether the ISP is included in a group of ISPs maintained by the firewall;
            in response to determining that the ISP is not included in the group of ISPs maintained by the firewall, adding the ISP to the group of ISPs; and
            adding the external IP address to the group of IP addresses; and
        causing a user interface to be presented that indicates a number of network packets that have been blocked that are associated with the external IP address.

2. The method of claim 1, wherein determining whether to add the external IP address to the group of IP addresses is based on input received via the user interface.

3. The method of claim 2, further comprising causing the user interface to be presented, wherein the user interface indicates the external IP address and the ISP associated with the external IP address.

4. The method of claim 1, further comprising identifying geographic information associated with the external IP address, wherein determining whether to add the external IP address to the group of IP addresses is based on the geographic information associated with the external IP address.

5. The method of claim 1, wherein the group of IP addresses are blocked from transmitting data to the internal device.

6. A system for adding Internet Protocol (IP) addresses to a firewall, the system comprising:
    a hardware processor that is programmed to:
        receive a network packet that includes an external IP address associated with an external device, wherein the external device is a device not protected by the firewall;
        determine whether the external IP address is included in a group of IP addresses maintained by the firewall that are either blocked from receiving data from an internal device protected by the firewall or allowed to receive data from an internal device protected by the firewall;
        in response to determining that the external IP address is not included in the group of IP addresses:
            identify an Internet Service Provider (ISP) associated with the external IP address;
            causing a user interface to be presented to a user, wherein the user interface includes a preview that shows a web page of a domain associated with the external IP address;
            determine whether to add the external IP address to the group of IP addresses based at least in part on the ISP associated with the external IP address;
            in response to determining that the external IP address is to be added to the group of IP addresses:
                determine whether the ISP is included in a group of ISPs maintained by the firewall;
                in response to determining that the ISP is not included in the group of ISPs maintained by the firewall, add the ISP to the group of ISPs; and
            add the external IP address to the group of IP addresses; and
        cause a user interface to be presented that indicates a number of network packets that have been blocked that are associated with the external IP address.

7. The system of claim 6, wherein determining whether to add the external IP address to the group of IP addresses is based on input received via the user interface.

8. The system of claim 7, wherein the hardware processor is further programmed to cause the user interface to be presented, wherein the user interface indicates the external IP address and the ISP associated with the external IP address.

9. The system of claim 6, wherein the hardware processor is further programmed to identify geographic information associated with the external IP address, wherein determining whether to add the external IP address to the group of IP addresses is based on the geographic information associated with the external IP address.

10. The system of claim 6, wherein the group of IP addresses are blocked from transmitting data to the internal device.

11. A non-transitory computer-readable medium containing computer executable instructions that, when executed by a processor, cause the processor to perform a method for adding Internet Protocol (IP) addresses to a firewall, the method comprising:
    receiving a network packet that includes an external IP address associated with an external device, wherein the external device is a device not protected by the firewall;
    determining whether the external IP address is included in a group of IP addresses maintained by the firewall that are either blocked from receiving data from an internal device protected by the firewall or allowed to receive data from an internal device protected by the firewall;
    in response to determining that the external IP address is not included in the group of IP addresses:

identifying an Internet Service Provider (ISP) associated with the external IP address;

causing a user interface to be presented to a user, wherein the user interface includes a preview that shows a web page of a domain associated with the external IP address;

determining whether to add the external IP address to the group of IP addresses based at least in part on the ISP associated with the external IP address;

in response to determining that the external IP address is to be added to the group of IP addresses:

determining whether the ISP is included in a group of ISPs maintained by the firewall;

in response to determining that the ISP is not included in the group of ISPs maintained by the firewall, adding the ISP to the group of ISPs; and adding the external IP address to the group of IP addresses; and causing a user interface to be presented that indicates a number of network packets that have been blocked that are associated with the external IP address.

12. The non-transitory computer-readable medium of claim 11, wherein determining whether to add the external IP address to the group of IP addresses is based on input received via the user interface.

13. The non-transitory computer-readable medium of claim 12, wherein the method further comprises causing the user interface to be presented, wherein the user interface indicates the external IP address and the ISP associated with the external IP address.

14. The non-transitory computer-readable medium of claim 11, wherein the method further comprises identifying geographic information associated with the external IP address, wherein determining whether to add the external IP address to the group of IP addresses is based on the geographic information associated with the external IP address.

15. The non-transitory computer-readable medium of claim 11, wherein the group of IP addresses are blocked from transmitting data to the internal device.

\* \* \* \* \*